Figure 1:
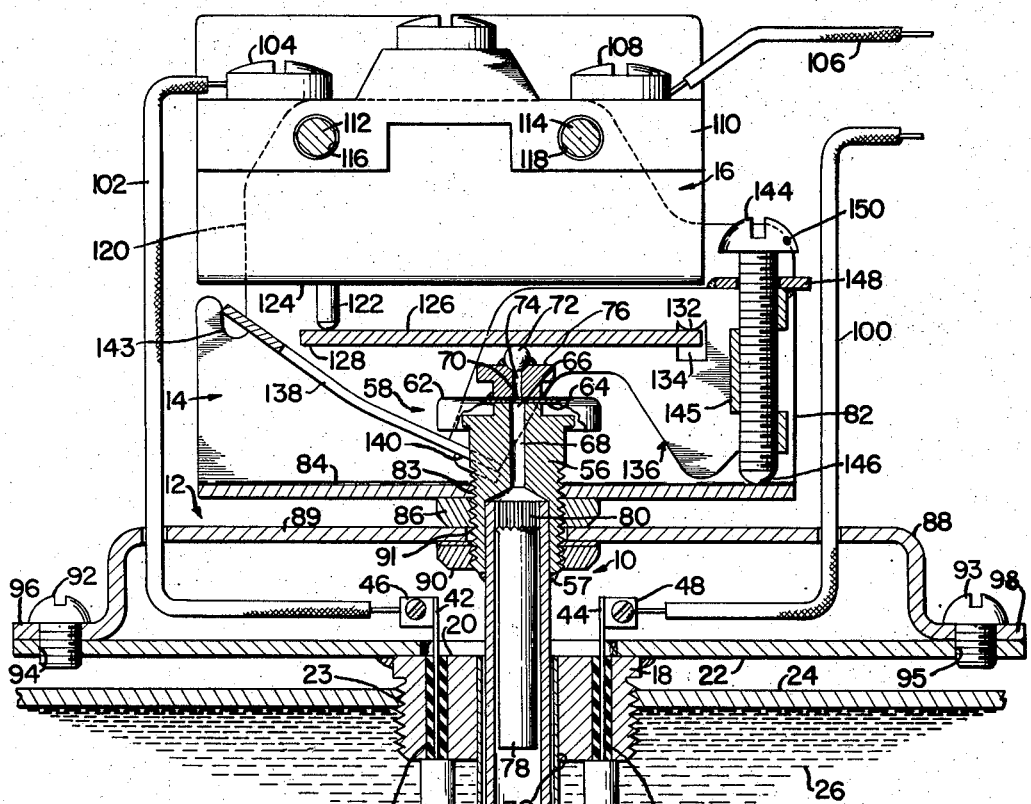

Aug. 4, 1964  H. J. TYLER  3,143,620
THERMOSTAT DEVICE WITH OVER TEMPERATURE SAFETY MEANS
Filed Dec. 28, 1959  2 Sheets-Sheet 1

Aug. 4, 1964  H. J. TYLER  3,143,620
THERMOSTAT DEVICE WITH OVER TEMPERATURE SAFETY MEANS
Filed Dec. 28, 1959  2 Sheets-Sheet 2

United States Patent Office 3,143,620
Patented Aug. 4, 1964

3,143,620
THERMOSTAT DEVICE WITH OVER
TEMPERATURE SAFETY MEANS
Hugh J. Tyler, Jeannette, Pa., assignor to Robertshaw
Controls Company, Richmond, Va., a corporation of
Delaware
Filed Dec. 28, 1959, Ser. No. 862,153
2 Claims. (Cl. 200—140)

This invention relates generally to a thermostat for controlling the temperature of a fluid and more particularly to a thermostat for controlling temperature varying devices immersed in a fluid.

It is an object of this invention to construct a simple, compact and reliable thermostat for controlling temperature varying devices permitting economy of manufacture and facilitating installation and repair.

Another object of this invention is to incorporate a conveniently accessible temperature setting means in a device of the indicated type.

Another object of this invention is a rugged and compact hydraulic sensing means for a device of the indicated type.

A further object of this invention is to incorporate safety linkage in a thermostat for controlling a temperature varying device to prevent damage at an overtemperature condition.

Still another object of this invention is to construct a thermostat for controlling a temperature varying device which is mounted in a relatively narrow casing, so that two or more thermostats can be placed side by side for multiple thermostatic control in a minimum of space.

In a preferred embodiment of the invention, the thermostat is mounted on and adjacent to an immersion heater unit. A unitary structure is provided wherein an electric heating means is carried on a plug member which can be mounted in the wall of the container of the fluid to be heated so that the heating means is immersed in the fluid. A well member is also mounted on the plug member so as to be immersed in the fluid when the plug member is located in the wall of the fluid container. A thermally responsive means is mounted on a frame and has a temperature sensing means extending into the well member. The thermally responsive means operates a switch in accordance with the temperature variations of the fluid. By this arrangement, a simple, compact and unitary structure is provided.

Although the preferred embodiment of the thermostat has been described above relative to an immersion heater unit, it will be understood that a refrigerating unit can be readily substituted for the immersion heater unit without departing from the spirit of the invention. The use of a double-throw switch is contemplated, which switch will actuate a refrigerating unit, as increased temperatures of the fluid are sensed.

Other objects and arrangements of the invention will become apparent from the following description taken in conjunction with the accompanying drawings wherein the same structural members have been assigned the same reference numerals.

Figure 2:
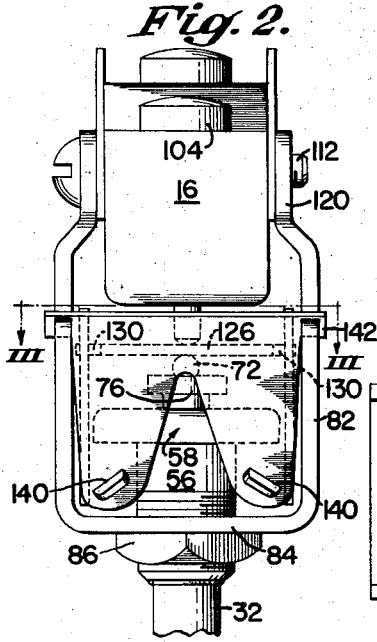
Figure 3:
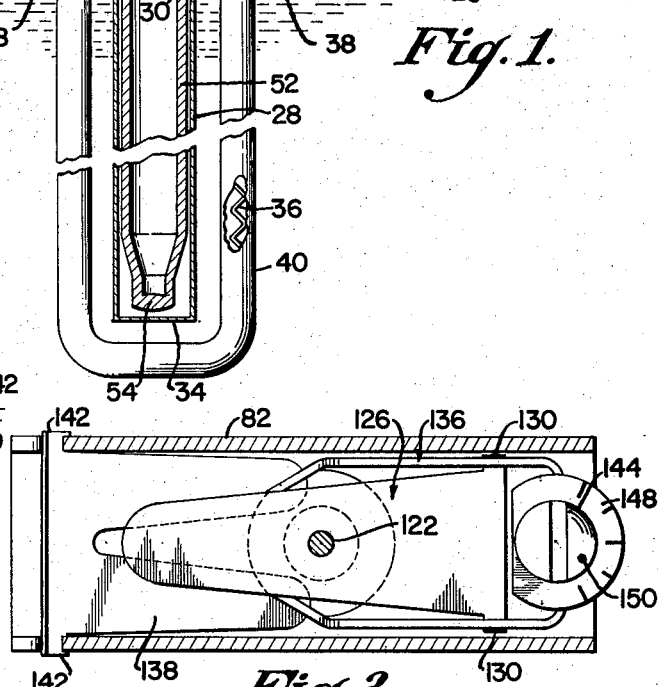
Figure 4:
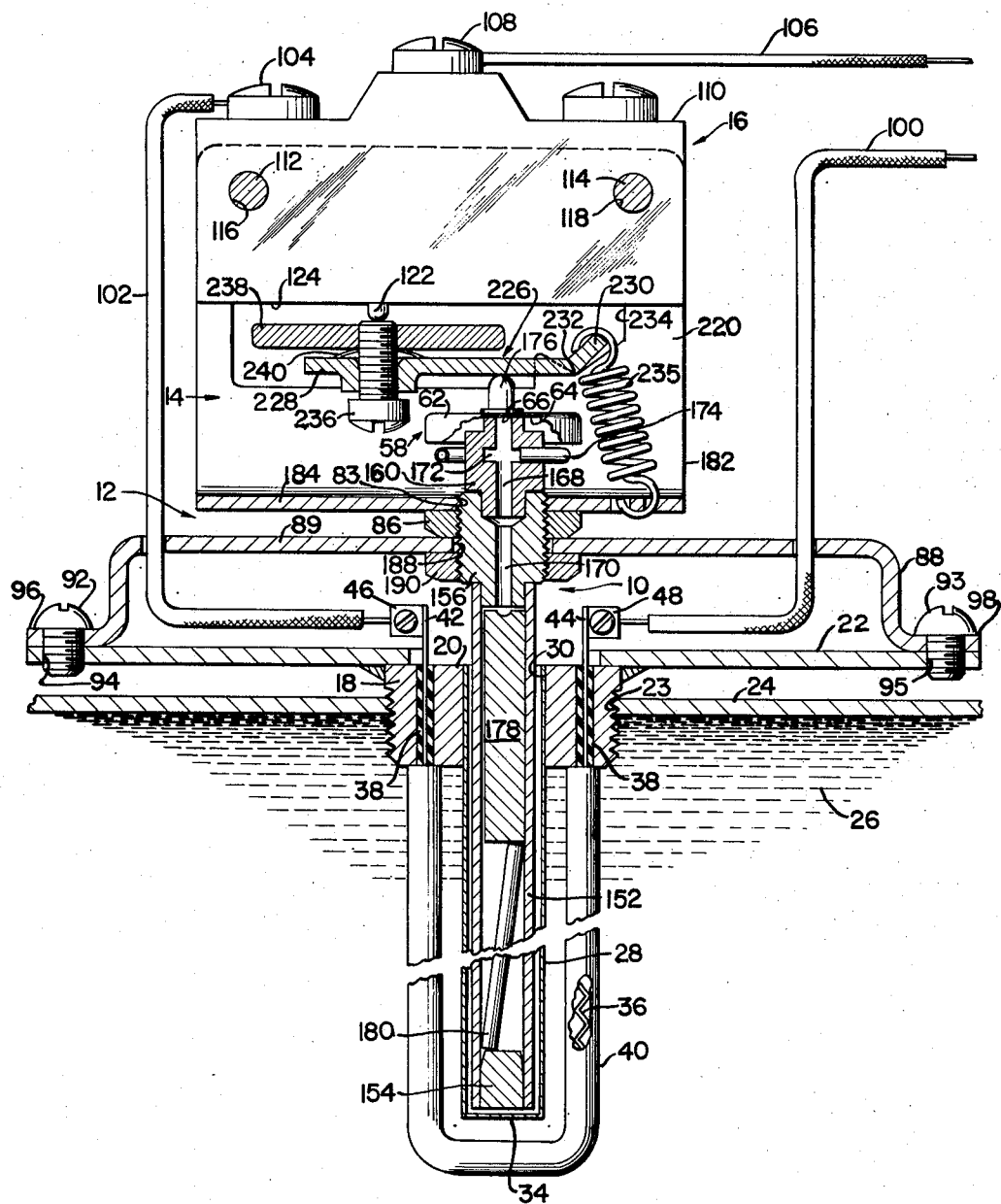

In the drawings:
FIG. 1 is an elevation view, partly in section, of a preferred embodiment of this invention;
FIG. 2 is an end view of the thermostat and switch shown in FIG. 1;
FIG. 3 is a plan view of the device shown in FIG. 2 taken along the line III—III; and
FIG. 4 is an elevation view, partly in section, of a modification of this invention.

Referring more particularly to FIGS. 1–3, the immersion heater thermostat comprises a thermally responsive means 10 mounted on a frame 12 with linkage 14 operatively connecting the thermally responsive means 10 to switch 16. An annular plug member 18 is secured at its outer end 20 by welding or other suitable means to frame member 22 and is adapted to be threadedly mounted in an opening 23 in the container wall 24 of the fluid 26 to be heated. A tubular well member 28 is secured at one end to the inner wall 30 of plug member 18 and depends therefrom to be immersed in fluid 26. An end wall portion 34 serves to close the immersed end of well member 28.

A U-shaped electric heating element 36 also depends from plug member 18 and extends around well member 28 from a pair of insulators 38 carried by plug member 18. A tubular sheath 40 covers the portion of heating element 36 immersed in fluid 26. The opposite ends 42 and 44 of heating element 36 extend from the outer end 20 of plug member 18 and are connected to a pair of terminals 46 and 48, respectively.

Thermally responsive means 10 senses the temperature of fluid 26. Such means comprises a tubular temperature sensing bulb 52 projecting within well member 28 and having a sealed end 54 and the other end threadedly secured to a cylindrical mounting stud 56, such as by soldering 57 or other suitable means. An expansible and contractible element 58 is mounted on stud member 56. Expansible and contractible element 58 comprises an outer cup-shaped member 62 and an inner cup-shaped member 64 nested within outer member 62 and joined at their outer peripheries to form a liquid tight seal. The base of inner member 64 is secured to stud member 56 and has a central opening 66 communicating with a bore 68 in stud member 56.

The face of cup-shaped outer member 62 is secured to an outer stud 76, and has a central opening 70 communicating with a bore 74 in outer stud member 76. Bore 74 is sealed by welding a ball 72 in place after a filling operation, wherein a temperature sensing fluid is injected into passage 74 to fill the passageway defined by bores 68 and 74 and sensing bulb 52. The temperature sensing fluid is such that it will vary in volume in response to temperature changes. Since a closed system is formed after the filling operation, it will be apparent that in response to an increase in the temperature of the fluid in the temperature sensing bulb 52, the fluid volume increases and fluid is forced into the space between members 62 and 64. This will cause a separating movement of members 62 and 64 whereby outer member 62 moves outwardly of stud member 56. The ball 72 mounted on the outer stud 76 is displaced directly proportional to the movement of outer member 62, for a purpose to be described hereinafter.

Means are provided within temperature sensing bulb 52 to reduce the temperature sensitivity of bulb 52 in the section extending within plug member 18 by minimizing the volume of the temperature sensing fluid in this area. Such means takes the form of a plug 78 which is maintained in the outer portion of temperature sensing bulb 52 by a straight knurled section 80 which has a diameter slightly greater than the inner diameter of bulb 52. A plurality of passages are formed between the inner wall of sensing bulb 52 and the serrations of knurled section 80 to permit fluid flow. The outer diameter of unknurled portion of plug 78 is slightly less than the inner diameter of temperature sensing bulb 52 to permit the passage of the temperature sensing fluid therebetween.

Thermally responsive means 10 is mounted on an outer frame member 82, which has a U-shaped configuration, by means of a threaded portion on the exterior of mounting stud 56 which cooperates with a threaded opening 83 in the base 84 of outer frame member 82. Thermally responsive means 10 is locked in position by means of a lock nut 86 which fits on a threaded portion of mounting stud 56.

Outer frame member 82 is connected with frame member 22 by means of a mounting bracket 88, which has a generally U-shaped construction. The base 89 of mounting bracket 88 has an opening 91 which is adapted to receive mounting stud 56. A nut 90, threaded onto mounting stud 56, rigidly secures the assembly including thermally responsive means 10 and outer frame member 82 to mounting bracket 88. Mounting bracket 88 is connected to frame member 22 by means of a pair of screws 92 and 93 threadedly engaging holes 94 and 95, respectively, in frame member 22 and extending through holes in cooperating flanges 96 and 98 on mounting bracket 88.

A circuit means is provided for connecting heating element 36 to a source of electric energy. To this end, a first conductor 100 has one end connected to terminal 48 and the other end adapted to be connected to a source of electric energy. A second conductor 102 is connected between terminal 46 and terminal 104 of a double-throw switch 16 of a suitable type. A third conductor 106 has one end connected to a terminal 108 of double-throw switch 16 and the other end adapted to be connected to a source of electric energy. As is well known in the art, terminal 104 is connected to one contact arm (not shown) within the switch casing 110 of switch 16 and terminal 108 is connected to another contact arm (not shown) within switch casing 110 so that switch 16 is serially connected to the means for heating element 36.

Switch 16 is rigidly mounted to the side members 120 of U-shaped outer frame member 82 by means of a pair of bolts 112 and 114 extending through holes 116 and 118, respectively, in switch casing 110. A switch button 122 is mounted for axial movement through a wall 124 of switch casing 110 facing thermally responsive means 10 and is biased to extend outwardly of wall 124. Double-throw switch 16 can be of any suitable type wherein the movement of switch button 122 inwardly of casing 110 causes opening of the switch contacts (not shown) and movement of switch button 122 in the opposite direction causes closing of the contacts. Hence, the position of switch button 122 will control the opening and closing of the circuit to heating element 30. Snap-acting switches are one type of switch well known in the art which will operate in this manner.

An operative linkage connection 14 is provided between thermally responsive means 10 and switch 16 to actuate the latter between the circuit opening and circuit closing positions thereof in response to the thermally responsive movement of thermally responsive means 10. Such operative linkage connection comprises a lever arm 126 having a longitudinally extending end portion 128. The opposite end of lever arm 126 is formed with laterally extending projections 130. Lever arm 126 is positioned to engage ball 72 at an intermediate point and with the lateral extremities of projections 130 engaging a pair of oppositely disposed fulcrums 132 formed in a pair of oppositely disposed cutouts 134 in the sidewalls of a U-shaped adjusting yoke 136.

A flat spring 138 is substantially rigidly connected by a tongue and groove means to adjusting yoke 136 at 140. Flat spring 138 is biased in a clockwise direction by lateral sections 142 being forced into cutout sections 143 of side members 120. An adjusting screw 144 is threaded into offset member 145, formed from the bight portion of U-shaped adjusting yoke 136, and is biased by adjusting yoke 136 in a clockwise direction to engage frame 82 at point 146. Turning adjusting screw 144 thereby pivots adjusting yoke 136 about point 140 to vertically displace fulcrum 132 to adjust the setting of the thermostat. It will thus be apparent that lever arm 126 pivots about fulcrums 132 in response to expansion and contraction of element 58.

A dial plate 148 is provided to indicate the temperature setting of the thermostat. A pointer is provided on adjusting screw 144 by a dot of paint 150, which cooperates with a dial plate 148 to indicate the temperature setting.

In operation, after the immersion heater unit has been assembled in container wall 24, temperature adjusting screw 144 is rotated to the desired temperature setting position in accordance with the marking thereon. Temperature sensing bulb 52 will sense an increase in the temperature of fluid 26 and the temperature sensing fluid contained therein will be expanded accordingly. If the temperature of fluid 26 is below the desired temperature, expansible and contractible element 58, acting through ball 72, will position lever arm 126 so that switch button 122 will be maintained in the switch closed position thereof, thereby completing the circuit to heating element 36.

As the temperature of fluid 26 is raised by the heating action of heating element 36, element 58 expands as the increased volume of the temperature sensing fluid causes fluid to be forced into the space between members 62 and 64. The expanding movement of element 58 causes lever arm 126 to pivot in a clockwise direction about fulcrums 132, thereby forcing switch button 122 inwardly. When the desired fluid temperature is reached, element 58 will have caused sufficient clockwise movement of lever arm 126 to force switch button 122 to the switch open position, whereby the circuit to heating element 36 is broken.

If the temperature of fluid 26 should continue to increase after the circuit to heating element 36 has been broken, switch button 122 will then function as the fulcrum for lever arm 126. Hence, as element 58 expands, lever arm 126 overcomes the force of spring 138 and rotates in a counterclockwise direction to lift the adjusting screw 144 away from its contact point 146 on frame 82. This action allows fulcrum points 132 to rise when a predetermined force against ball 72 is reached and thereby does not limit the expansion of expansible and contractible element 58 due to overtemperature conditions of fluid 26. Thus, damage to expansible members 62 and 64 is prevented.

As the fluid temperature decreases from the overtemperature condition, fulcrums 132 will assume their normal position when temperature adjusting screw 144 touches at point 146 on frame 82. If the temperature of fluid 26 should decrease, then a corresponding decrease in the volume of the temperature sensing fluid permits contraction of element 58. Lever 126 will thus be rotated in a counterclockwise direction about fulcrums 132 under the action of switch button 122 which will gradually move toward the switch closing position in acordance with its outward bias. When switch button 122 reaches the switch closed position, the circuits to heating element 36 will be again closed.

The immersion heater unit will cycle in the above manner to maintain fluid 26 at the desired temperature.

In another embodiment of this invention, shown in FIG. 4, a thermally responsive means 10 senses the temperature of fluid 26. Such means comprises a tubular temperature sensing bulb 152 projecting within well member 28 and having one end sealed by a plug 154 and the other end secured to a cylindrical mounting member 156. An expansible and contractible element 58 is mounted on a stud member 160 which is secured to a mounting member 156 by soldering or other suitable means. As previously described, expansible and contractible element 58 comprises an outer cup-shaped member 62 and an inner cup-shaped member 64 nested within outer member 62. The base of inner member 64 is secured to stud member 160 and has a central opening 66 communicating with a bore 168 in stud member 160.

A bore 170 in mounting member 156 defines a passageway from bore 168 to the interior of temperature sensing bulb 152. A second bore 172 in stud member 160 is adapted to receive one end of a filling capillary tube 174 which has its opposite end closed and sealed after a filling operation wherein a temperature sensing fluid is injected into stud member 160 to fill the passageways defined by bores 168, 170, and 172, the space between members 62 and 64, and the interior of the temperature sensing bulb 152. The temperature sensing fluid is such that it will vary in volume in response to temperature changes.

As previously described relative to FIGS. 1–3, an increase in temperature of the fluid in the temperature sensing bulb 152 will increase the fluid volume and force fluid into the space between members 62 and 64. This will cause a separating movement of members 62 and 64, whereby outer member 62 moves outwardly of stud member 160. A bearing member 176 is mounted on outer member 62 for movement therewith for a purpose to be hereinafter described.

Means are provided within temperature sensing bulb 152 to minimize the amount of temperature sensing fluid required. Such means takes the form of a plug 178 which is maintained in the outer portion of temperature sensing bulb 152 by a spacer member 180 positioned between plug 154 and plug 178. The outer diameter of plug 178 is slightly less than the inner diameter of temperature sensing bulb 152 to permit the passage of the temperature sensing fluid therebetween.

A central opening 188 in the base 89 of mounting bracket 88 is adapted to receive mounting member 156. A nut 190, threaded onto mounting member 156, rigidly secures the assembly, including thermally responsive means 10 and outer frame member 182, to mounting bracket 88.

Switch 16 is rigidly mounted on outer frame member 182 by means of a pair of bolts 112 and 114 extending through holes 116 and 118, respectively, in switch casing 110 and is secured to the side members 220 of outer frame member 182.

As previously described, a switch button 122 extends through wall 124 of switch casing 110 and operates in the same manner as described above.

An operative linkage connection 14 is located between thermally responsive means 10 and switch 16. Such operative connection comprises a lever arm 226 having a longitudinally extending portion 228 angularly joined with a laterally extending portion 230 at one end thereof. Lever arm 226 is positioned with longitudinal portion 228 engaging bearing 176 at an intermediate point on lever arm 226 and with lateral extremities of lateral portion 230 engaging a pair of oppositely disposed V-shaped fulcrums 232 formed in a pair of oppositely disposed cutouts 234 in the sidewalls 220 of U-shaped outer frame member 182.

A spring 235 is positioned in tension between portion 230 and base 184 of outer frame member 182 to bias portion 230 into engagement with fulcrums 232. It will thus be apparent that lever arm 226 pivots about fulcrums 232 in response to expansion and contraction of element 58.

An adjusting screw 236 is threadedly mounted in the outermost end of portion 228 for engagement with switch button 122. Screw 236 is adjustable relative to the lever arm 226 by means of a disc-like knob 238 secured to screw 236. The periphery of knob 238 extends through cutouts 234 whereby knob 238 is conveniently accessible. Knob 238 has suitable indicia marked thereon to indicate temperature settings. It will thus be apparent that the position of screw 236 with respect to lever arm 226 will determine the amount of movement of lever arm 226 about fulcrums 232 necessary to actuate switch button 122 to open the circuit to heating element 36. A spring washer 240 is mounted on screw 236 in compression between lever arm 226 and knob 238 to provide a drag on knob 238, thereby restricting inadvertent movement of the knob 238.

In operation, after the immersion heater unit has been assembled in container wall 24, knob 238 is rotated to the desired temperature setting position in accordance with markings thereon. Temperature sensing bulb 152 will sense the temperature of fluid 26 and the temperature sensing fluid will be expanded or contracted accordingly. If the temperature of fluid 26 is raised by the heating action of heating element 36, element 58 expands since the increased volume of the temperature sensing fluid causes fluid to be forced into the space between members 62 and 64. This expansion movement of element 58 causes lever arm 226 to pivot in a clockwise direction about fulcrums 232, thereby forcing switch button 122 inwardly by means of adjusting screw 236. When the desired fluid temperature is reached, element 58 will have caused sufficient clockwise movement of lever arm 226 to force switch button 122 to the switch open position whereby the circuit to heating element 36 is broken.

If the temperature of fluid 26 should continue to increase for some reason after the circuit to heating element 36 has been broken, switch button 122 will function as the fulcrum for lever arm 226. As element 58 expands, lever arm 226 overcomes the force of spring 235 and lifts off fulcrums 232 pivoting in a counterclockwise direction about switch button 122. This construction prevents any possible damage to switch 16 due to overtemperature conditions of fluid 26.

As the fluid temperature decreases from the overtemperature condition, lever arm 226 will return into engagement with fulcrums 232 by the action of spring 235.

In this manner the immersion heater unit will cycle in the above manner to maintain fluid 26 at the desired temperature.

It will be apparent that the described construction forms a simple, compact and reliable thermostatic unit, wherein the unit can easily be replaced if damaged without entering the container, and the temperature setting means and the wiring terminals are conveniently accessible even though several switch units are mounted side by side and very close together.

In addition, the described construction forms a thermostatic unit which has an overtemperature safety linkage to prevent damage to component elements of the unit.

Although two embodiments of this invention have been shown and described for purposes of illustration as controlling heating units, it is to be understood that the invention can be variously embodied to control either heating or cooling units. Changes may be made in the construction and arrangement of parts without departing from the scope of the invention as defined by the appended claims.

I claim:

1. A temperature responsive control device comprising: a U-shaped frame member, a switch detachably mounted between the opposite legs of said member, said switch having an actuating button extending toward the connecting leg of said member, each of said opposite legs having an opening between said switch and said connecting leg, each opening including a portion defining a fulcrum point for a lever, a lever positioned between said legs for pivotal movement about said fulcrum points, means resiliently biasing said lever into engagement with said fulcrum points, a shaft threadedly mounted on said lever and arranged to actuate said switch button when said lever is pivoted about said fulcrum points, a disc secured to said shaft, said disc having a portion thereof extending through at least one of said openings whereby said disc may be rotated to adjust the position of said shaft with respect to said switch buttom, a liquid-filled thermostatic element having a portion thereof which moves with changes in temperature sensed by said thermostatic element, said element extending through said connecting leg with said portion engaging said lever intermediate said shaft and said fulcrum points to position said lever with respect to said switch button in response to the temperature sensed by said element, and means adjustably mounting said element in said connecting leg whereby said device is calibrated solely by adjustment of said element with respect to said connecting leg whereby said switch is actuated at a temperature corresponding to a selected position of said disc.

2. A temperature responsive control device comprising: a U-shaped frame member, a switch detachably mounted between the opposite legs of said member, said switch having an actuating button extending toward the connecting leg of said member which is movable through a limited distance when moved toward said switch, each of said opposite legs having an opening between said switch and said connecting leg, each opening including a portion defining a fulcrum point for a lever, a lever positioned between said legs for pivotal movement about said fulcrum points, a shaft threadedly mounted on said lever and arranged to actuate said switch button when said lever is pivoted about said fulcrum points, a disc secured to said shaft, said disc having a portion thereof extending through at least one of said openings whereby said disc may be rotated to adjust the position of said shaft with respect to said switch button, a liquid-filled thermostatic element having a portion thereof which moves with changes in temperature sensed by said thermostatic element, said element extending through said connecting leg and engaging said lever intermediate said shaft and said fulcrum points to position said lever with respect to said switch button in response to the temperature sensed by said element, means for positioning said element in said connecting leg whereby said device is calibrated solely by adjustment of said element with respect to said connecting leg whereby said switch is actuated at a temperature corresponding to a selected position of said disc, and means resiliently biasing said lever into engagement with said fulcrum points with a force sufficient to hold said lever so engaged during movement of said lever toward said switch by action of said thermostatic element, but with a force insufficient to so hold said lever after said switch button is moved through said limited distance whereby said lever is then pivoted about said switch button.

References Cited in the file of this patent
UNITED STATES PATENTS

| | | |
|---|---|---|
| 2,437,262 | Levitt et al. | Mar. 9, 1948 |
| 2,460,762 | Minnich | Feb. 1, 1949 |
| 2,778,576 | Johnston | Jan. 22, 1957 |
| 2,778,917 | Sullivan | Jan. 22, 1957 |
| 2,809,523 | Burling et al. | Oct. 15, 1957 |
| 2,924,388 | Beck et al. | Feb. 9, 1960 |

FOREIGN PATENTS

| | | |
|---|---|---|
| 798,099 | Great Britain | July 16, 1958 |